United States Patent [19]

Seilenbinder

[11] 3,888,450
[45] June 10, 1975

[54] VIBRATION ABSORBING MOUNTING ELEMENT

[75] Inventor: Richard W. Seilenbinder, Milwaukee, Wis.

[73] Assignee: Briggs & Stratton Corporation, Wauwatosa, Wis.

[22] Filed: May 31, 1974

[21] Appl. No.: 475,045

[52] U.S. Cl. .............. 248/358 R; 248/6; 267/22 R; 267/151
[51] Int. Cl. ............................................. F16f 15/04
[58] Field of Search ....... 248/6, 8, 9, 21, 22, 358 R; 267/22, 35, 63 R, 139–141, 151–153, 113, 116, 121, 181; 188/1 B

[56] References Cited
UNITED STATES PATENTS

| | | | |
|---|---|---|---|
| 2,965,349 | 12/1960 | Hutton | 248/9 |
| 2,969,656 | 1/1961 | Reuter | 267/63 R |
| 3,037,585 | 6/1962 | Williams | 248/358 R |
| 3,107,752 | 10/1963 | McLean | 248/358 R |
| 3,231,255 | 1/1966 | Olson | 248/358 R |
| 3,266,600 | 8/1966 | Brunner | 188/1 B |
| 3,494,607 | 2/1970 | Rusch | 267/152 |
| 3,574,379 | 4/1971 | Jordan | 267/140 |
| 3,730,302 | 5/1973 | Ogawa et al. | 188/1 B |
| 3,738,633 | 6/1973 | Pineau | 267/63 R |
| 3,747,915 | 7/1973 | Hall | 267/139 |

FOREIGN PATENTS OR APPLICATIONS

| | | | |
|---|---|---|---|
| 1,063,754 | 3/1967 | United Kingdom | 267/153 |
| 1,185,854 | 3/1970 | United Kingdom | 267/63 R |

Primary Examiner—Marion Parsons, Jr.
Assistant Examiner—Lawrence J. Staab

[57] ABSTRACT

A mounting pad for engines and similar vibration producing members comprises a pair of rigid porous bodies with opposing flat faces, between which, and in the pores of which, there is liquid lubricant. A fairly thick resilient enclosure surrounds the bodies and lubricant. Securement elements are bonded to opposite sides of the enclosure with their axes normal to the flat faces of the bodies and passing through their geometrical centers. Relative movement between the securement elements, transmitted to the bodies through the enclosure, produces friction generating flows of the liquid.

5 Claims, 3 Drawing Figures

PATENTED JUN 10 1975

3,888,450

VIBRATION ABSORBING MOUNTING ELEMENT

This invention relates to vibration absorbing mounting elements, and is more particularly concerned with a mounting pad or support by which an engine or similar vibration producing member can be mounted on another member and by which vibration of the engine is substantially isolated and wholly or in substantial part prevented from reaching the other member.

The mounting of a single cylinder engine on a machine that it powers is a familiar example of the problem to which the instant invention is directed; hence for purposes of illustration the invention is herein discussed and disclosed in relation to such an application. However, it will be understood that the invention is advantageous for mounting many other types of vibration producing members.

Although it is possible to design and build a single cylinder engine so that it operates with no noticeable vibration, such inherently vibration-free engines are relatively expensive. The type of engine usually used for powering a lawn mower, tractor or similar machine, is therefore one that tends to generate a substantial amount of vibration, and when such an engine is rigidly mounted on a machine, its vibration is imparted to the machine and through it to the operator. The operator may not be consciously annoyed by the vibration of a tractor seat or lawn mower handle when he is using the machine, but there can be no doubt that such vibration is annoying and fatiguing and that its elimination would be very desirable. Recently it has been found that vibration of the machine itself it additionally undesirable because it is responsible for a certain amount of noise generation.

To enable inexpensive engines to be used for powering lawn mowers and similar machines without incurring vibration of the machine, a great deal of attention has recently been given to the provision of vibration absorbing mounting pads or supporting elements for such engines.

When an engine operates at any given speed, it developes vibration forces that tend to move it through small distances in two or more directions at almost — but not quite — the same time; and thus it generates vibrations of several modes. Since an engine can operate at any of a wide range of speeds, each of such modes of vibration can occur at any of a wide range of frequencies, and different modes of vibration can develop or predominate at different speeds.

Thus, for a vibration absorbing engine mount to be fully satisfactory, it must be capable of accommodating all modes of engine vibration over a wide range of vibration frequencies.

In general, a vibration absorbing mounting pad or supporting element must have a certain amount of resilience, to permit the engine or other vibration producing member to have a degree of freedom of movement relative to the machine frame to which it is attached. In this respect the mounting element can be regarded as a vibration isolator, inasmuch as it confines vibration to the vibratory member itself.

If the mounting element were in the nature of a simple metal spring or springs interposed between the engine and the machine frame, the engine would be free for a certain amount of movement relative to the frame, but vibration could nevertheless be transferred to the frame. A metal spring has relatively little internal friction, and therefore it stores almost all of the energy that is expended in elastically deforming it, returning that energy to the members against which it reacts when it restores itself to its relaxed configuration. Furthermore, a metal spring or springs capable of supporting the weight of an engine would be relatively stiff and would therefore have a natural frequency too close to the frequency of engine vibrations to be effective in absorbing vibration. In the worst case, if an engine were mounted on springs having a natural frequency in tune with the frequency of the dominant mode of engine vibration, the mounting elements would absorb and give off energy at such times that their reactions would be added to the forces of engine vibration, and successive cycles of vibration would reinforce one another with the well known resonance effect, so that vibration of both the engine and the machine frame would actually be of much greater amplitude than if the engine were rigidly mounted on the frame.

Thus the mere resilient mounting of an engine on a machine frame is not necessarily enough in itself to isolate engine vibration from the frame. the resilient mounting must also have a nautral frequency substantially lower than any significant frequency of vibration generated by the engine. To obtain the necessary softness that affords a low natural frequency, rubber and similar elastomers (e.g., neoprene) have commonly been used for engine mounting pads.

However, elastomer mounting pads have certain disadvantages, as well as certain advantages. One of the advantages of an elastomer mounting pad is that its resilient deformation and restoration is attended by the production of a certain amount of internal friction. In other words, an elastomer has a substantial hysteresis. And one of the disadvantaages of the known elastomers is that their hysteresis is not as high as is desirable for an engine mounting pad.

If a vibration isolating device has a substantial amount of internal friction in addition to resilience, it cannot store all of the energy imparted to it during elastic deformation, nor return all of its stored energy to the system when it restores itself to its relaxed condition. It dissipates some of that energy in friction, both during deformation and during restoration. If enough of the vibration energy is thus dissipated in friction, assurance is had that the mounting element will not have a distinct natural frequency; or, in more technical terms, the mounting element will serve as a detuned coupling between the engine and the machine frame. Ideally, a mounting element would transform vibration energy into friction at such rates throughout the vibration cycle that a steady, constant reaction force would be imposed upon the machine frame.

While elastomers have recently been developed that have substantially higher hysteresis than those formerly known, even such newer elastomers have lower hysteresis than is needed for complete vibration absorption in many engine mount applications. And, of course, the higher hysteresis elastomers still possess other disadvantages of earlier elastomer mounting pads.

Because of the softness of a rubber or similar mounting pad, it tends to be elastically deformed or prestressed to a substantial extent when the relatively heavy weight of an engine is imposed upon it. As a result, it is soft in its reaction to upward vibration forces and hard in reaction to downward vibration forces. As pointed out above, this directional favoritism is undesirable because a vibration force may be exerted in any direction, and for best damping of complex modes of vibration the mounting element should accommodate forces in all directions without discrimination. Various expedients have therefore been devised for preloading an elastomer mounting pad in a manner to render it nondiscriminating directionally without substantial loss of its vibration damping capabilities. See, for example, U.S. Pat. No. 2,557,610, No. 2,044,649 and No. 3,007,692.

The prestressing of a mounting pad does not overcome another and very important disadvantage of elastomer mounting pads for engine installations, which inheres in the very softness that makes such mounting pads desirable. By way of example, consider an engine supported on a machine frame by means of elastomer mounting pads and having a conventional belt connection between its crankshaft and a shaft which rotates on an axis fixed with respect to the machine frame. Because of the softness of the mounting pads, the engine makes substantially large excursions in response to the vibration force that it generates, and because of such excursions the belt is alternately tightened and loosened so that power transmission is inefficient and may vary in such a manner as in itself to induce vibrations in the machine.

Of course elastomer mounting pads can be so designed as to keep engine excursions within tolerable limits for power transmission purposes, but such pads would still permit a substantial portion of the engine vibration to be transmitted to the machine frame. Because of the relatively low hysteresis of an elastomer pad, it has to be elastically deformed to a rather substantial extent in order for it to convert any appreciable amount of motion energy into friction; which is to say that an engine mounted on such a pad must be permitted to make large excursions in response to its vibration producing forces in order for its vibration energy to be dissipated in friction and not transmitted into the frame.

Thus the real need is for a mounting pad which has the softness of an elastomer, so as to have a low natural frequency, but which produces substantially more internal friction under its elastic deformation and restoration than is available from any known elastomer, so that such a mounting pad can permit an engine mounted on it to have very limited excursions in response to the vibration forces it generates but can nevertheless transform most of the vibration energy into friction.

There are of course numerous arrangements by which energy of relative motion between two members can be converted into friction. Most of those would involve friction between discrete solid bodies are obviously unavailable for use in an engine mount, not only because of the inevitable wearing of the parts that would occur in consequence of the friction, but also because no simple friction producing arrangement of solid bodies would permit the connected members to move relative to each other with equal degrees of freedom and of restraint in all directions of such movement.

Considered as an abstract proposition, it would obviously be desirable to take advantage of the shearing friction that can be developed in a viscous liquid under certain flow conditions, since such friction does not necessarily entail mechanical wear or physical or chemical breakdown. Heretofore, however, it has been far from obvious how fluid friction could be utilized for vibration damping in an engine mount or similar supporting element. Here, again, the problem of harnessing fluid friction for the purposes of an engine mount encounters the requirement that vibratory motion in all directions must be accommodated undiscriminatingly. There is also the very important consideration that any obvious expedient for utilizing fluid as a nondirectional energy absorber would be far too bulky — and probably much too expensive — for an engine mount. Considering that a minimum of three mounting elements are required for an engine or similar vibration producing member, and that space for the engine itself is often severely limited, it is evident that both extreme compactness and very low cost are essential requirements for a vibration absorbing engine mount.

The present invention involves a marked departure from all of the obvious expedients for utilizing fluid friction to absorb vibration energy and thus contemplates the provision of a vibration absorbing mounting element for engines and the like that is compact, inexpensive and very durable, and wherein the viscosity or internal friction of a liquid lubricant is utilized to prevent energy of vibration from being transmitted from one to the other of a pair of members that are connected by the mounting element.

Hence it is a general object of the present invention to provide a mounting element for engines and similar vibration generating devices whereby the vibration generator is permitted to move in any direction that is vibration urges it, but whereby such excursions of the vibration generator are very much limited by being subjected to frictional damping retardation of a substantially higher order than would be available with a simple elastomer mounting pad, so that such limitation of the vibratory excursions is attended by substantially complete absorption of the vibration energy rather than by transmission of vibrations to the member to which the vibration generator is connected.

Another object of the invention is to provide a compact and inexpensive mounting element by which a pair of members can be so connected that one of the members can have limited movement in all directions relative to the other, but whereby such movement is dampingly retarded by causing it to induce a small flow of viscous liquid and thus transform the energy of such movement into internal shearing forces in the liquid.

Another and more specific object of the invention is to provide a vibration isolating mounting element of the character described, comprising two solid bodies that are arranged for limited movement in all directions relative to one another and a quantity of liquid lubricant that prevents friction-producing contact between the bodies but is caused to undergo flow that produces internal shear in consequence of relative movement between the bodies so that the liquid dampingly retards such movement by its viscosity.

A further specific object of the invention is to provide a vibration isolating mounting element comprising two solid bodies and a quantity of liquid lubricant, arranged to cooperate in the manner just set forth, in combination with resilient connecting means by which a pair of relatively vibrating members are connected with one another in such a manner as to be free for limited motion in all directions relative to one another, and by which each of said members is so connected with one of said bodies that the retarding effect which the liquid produces upon the bodies damps such relative motion of the members.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which.

Figure 1:
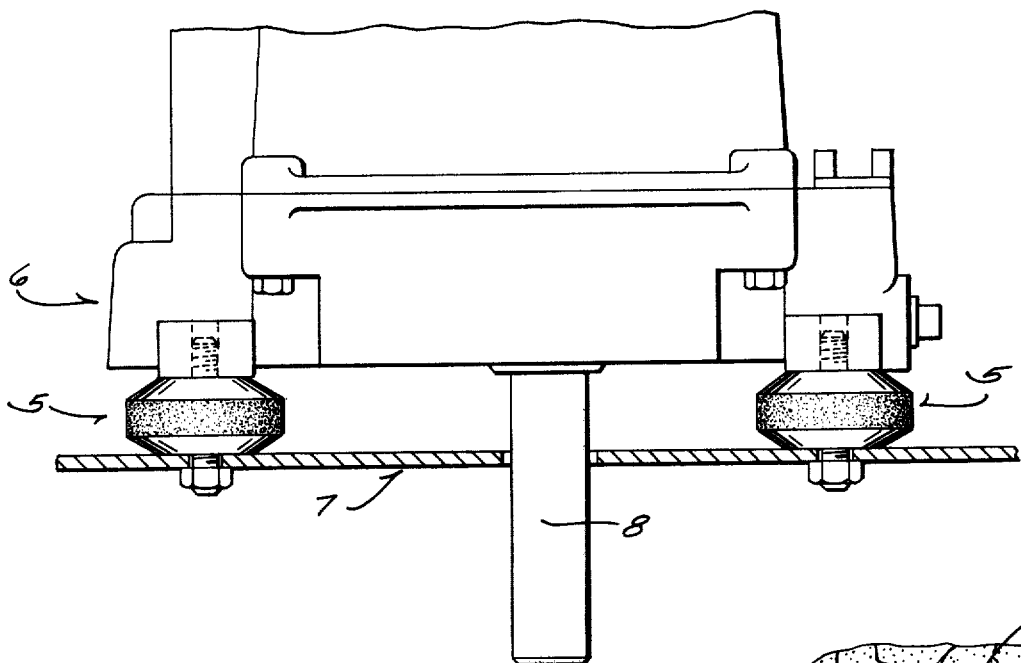
FIG. 1 is a fragmentary view of a small vertical shaft internal combustion engine mounted on the deck of a rotary power lawn mower by means of vibration absorbing mounting elements of the present invention, the view being mainly in side elevation but the lawn mower deck being shown in section.

Referring now more particularly to the accompanying drawings, the numeral 5 designates each of a plurality of vibration absorbing mounting elements or supporting pads embodying the principles of this invention and by which a pair of members 6 and 7 are secured in generally fixed relation to one another but are permitted to have limited relative motion whereby vibration produced by the member 6 is substantially prevented from being imposed upon the member 7. In this case the vibration producing member 6 is illustrated, for purposes of example, as an internal combustion engine having a vertical crankshaft 8, and the other member 7 comprises the frame or base of a machine upon which the engine is mounted. Typically the member 7 would be the deck of a power lawn mower, through which the crankshaft 8 projects downwardly, and in that case a cutter blade (not shown) would be mounted on the lower end portion of the crankshaft to be rotatably driven by the engine.

It will be understood that, for stability, the members 6 and 7 would be connected by at least three of the vibration absorbing mounts 5, although only two of them are visible in FIG. 1.

As pointed out hereinabove, a single cylinder internal combustion engine tends to generate vibrations of several modes when it is operating at any given speed, and can operate at any of a fairly wide range of speeds so that each of such modes of vibration can occur at any of a wide range of frequencies; and at different speeds different modes of vibration tend to develop or predominate. In consequence of all this, a vibration absorbing mounting that is suitable for the illustrated application must permit the members 6 and 7 to have substantially the same freedom for relative motion in all possible directions and must likewise provide for a damping of such motion that is substantially the same in every direction.

Figure 2:
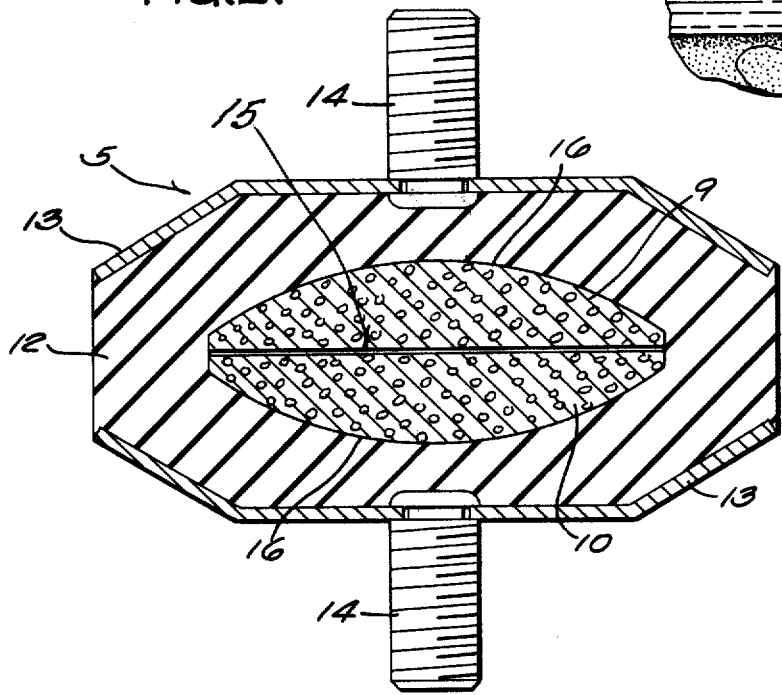
FIG. 2 is a sectional view taken on the axis of a mounting element of this invention.
Figure 3:
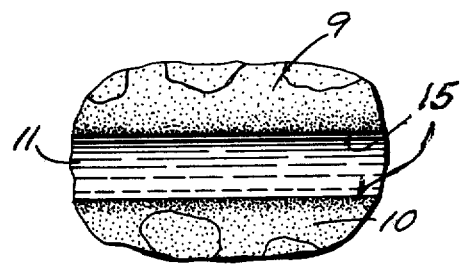
FIG. 3 is a fragmentary sectional view like FIG. 2 but on a much enlarged scale and taken near the center of FIG. 2.

Turning now to FIG. 2 for a consideration of the details of the mounting elements 5, each such device comprises, in general, a pair of rigid bodies 9 and 10 of porous material, a quantity of lubricant liquid, denoted by 11 and associated with the bodies 9 and 10 as explained below, a resilient enclosure 12 that completely surrounds the bodies and the lubricant liquid, a pair of dished, rigid reinforcing members 13 that are bonded to opposite sides of the enclosure 12, and a pair of studs 14 or the like, each coaxially secured to one of the reinforcing members and projecting outwardly from it.

Each of the rigid, porous bodies 9 and 10 can be made of sintered metal, metal foam or the like. The porosity of the bodies should be such that they can be substantially saturated with the lubricant liquid. The bodies are preferably identical in shape, each having a smooth flat surface 15 that opposes and is closely flatwise adjacent to the flat face 15 on the other. Preferably the opposing flat faces 15 of the bodies 9 and 10 are polished to ensure their smoothness, but the polishing operation should not close the pores that open to those surfaces. Other surfaces of each body can be left rather rough to promote bonding to the material of the enclosure 12. The surface 16 of each body that is opposite its flat face 15 is dome shaped, so as to be well adapted for receiving forces from all directions, and the two bodies together thus have a lenticular form.

The resilient enclosure 12 can be of neoprene or a similar elastomer, preferably one that is impervious to petroleum products. In external shape it is more or less an oblate spheroid, with its equator in the plane of the flat body surfaces 15. The enclosure has substantial thickness as measured outwardly in every direction from the bodies, so as to be susceptible to elastic deformation in all directions. The inner surfaces of the resilient enclosure closely conform in shape to the dome-shaped surfaces 16 of the porous bodies and are bonded to them so that movements of the resilient enclosure material will be imparted to the rigid bodies. Those skilled in the art will appreciate that there are various ways of molding the resilient enclosure around the porous bodies and the store of liquid lubricant, bonding it to the bodies in the molding process, and at the same time maintaining the bodies in proper relation to one another.

The dished reinforcing members 13 must be substantially rigid and must be securely bonded to the exterior of the resilient enclosure as well as securely fastened to the respective studs 14 that project from them, so that they can transmit into the material of the enclosure all forces that are imposed upon their studs. For the same reason, the reinforcing members should have substantial area, and preferably, as shown, the overall diameter of each is about equal to the diameter of the resilient enclosure. The reinforcing members and their studs are coaxial with one another, and it will be noted that the axis of the reinforcing members is normal to the flat body surfaces 15 and pass through the geometrical center of those surfaces.

As shown, each or the studs 14 is secured to its reinforcing member by passing a reduced diameter end portion of the stud through a closely fitting hole in the reinforcing member and then forming a rivet-like head on the inner end of the stud. Each stud can be threaded or otherwise arranged to accommodate suitable fastening means, and it will of course be understood that the illustrated studs 14 merely exemplify the numerous different kinds of fasteners that could be suitably employed.

It will be apparent that the resilient material of the enclosure 12 permits the two members 6 and 7 that are connected by the device to have some freedom for relative movement. Thus in the particular installation illustrated in FIG. 1, the engine 6 is free to float to a certain extent relative to the mower frame 7. At the same time, the inherent resilience of the enclosure material ensures that after any such floating excursion of the engine from its normal position, it will be drawn back to that position, although its return motion will be at a slower rate than its departing motion, owing both to the internal friction of the enclosure material and to the fluid friction provided by the liquid in cooperation with the porous bodies. In consequence, all motion of the engine relative to the mower itself will be dampingly retarded and the mounting elements will provide a detuned coupling between the engine and the mower.

As indicated above, any substantial motion of the studs 14 relative to one another will result in relative motion between the rigid porous bodies, inasmuch as the enclosure material will transmit such motion to those bodies to the extent that the motion is not absorbed by the resilience of that material.

If the bodies are moved relative to one another in any direction parallel to their flat faces, such motion obviously causes shearing of the liquid between those faces. If the bodies are moved relatively towards one another, liquid is displaced from the space between the bodies into the pores of the bodies; and because the liquid is thus in effect being forced to flow in relatively small and tortuous passages, its flow again involves a substantial amount of internal friction. If the relative movement between the bodies is in the direction to separate them, liquid will be drawn out of the pores into the space between the flat faces 15, again with the production of internal shearing in the liquid.

It will be observed that there will always be at least a thin film of lubricating liquid between the bodies so that they will not come into actual contact by which they could abrade one another. Although the bodies are substantially saturated with the lubricant liquid, it will be evident that some air will always remain in the pores of the bodies to serve more or less as a pressure cushion that can be compressed or displaced to permit liquid to flow into the pores as the bodies are converged and can expand to force liquid into the spaces between the bodies as they are moved apart.

From the foregoing description taken with the accompanying drawings it will be apparent that this invention provides a very compact and inexpensive vibration isolating mount by which an engine or similar vibration producing member can be connected with another member and by which vibrations of any and all modes and frequencies are prevented from being transmitted from the one member to the other.

Those skilled in the art will appreciate that the invention can be embodied in forms other than as herein disclosed for purposes of illustration.

The invention is defined by the following claims.

I claim:

1. A vibration absorbing mounting element by which a vibration producing device can be so connected with a part which carries the same as to prevent at least a substantial portion of the vibration of said device from being transmitted to said part, said mounting element comprising:

A. a pair of bodies of substantially rigid porous material, each having a flat, smooth surface of substantial area, said surfaces on the two bodies being closely opposed and complementary to one another, and said bodies being substantially saturated with a lubricant liquid that also separates their said flat surfaces;
   B. an enclosure of resilient material surrounding and closely embracing the bodies to contain the liquid and to confine the bodies with their said flat surfaces in opposing relationship but by its resilience accommodating limited relative movement between the bodies whereby liquid is displaced to dampingly retard such movement; and
   C. a pair of securement members, one attachable to said device and the other attachable to said part, said securement members being secured to the exterior of the enclosing at opposite sides of the plane of said surfaces of the bodies, each of said securement members being secured to a substantial area of the enclosure surface so that through the material of the enclosure relative motion between the securement members, due to vibratiaon of the device, is imposed upon said bodies and damping retardation of movement of the bodies is imposed upon the securement members.

2. A vibration absorbing device connectable between a pair of members to minimize transmission of vibration from one to the other of them while confining them in generally fixed relation to one another, said device comprising:

A. a pair of bodies of substantially rigid porous material having smooth, opposed, closely adjacent flat surfaces of substantial area;
   B. a body of lubricant liquid interposed between said surfaces of the two bodies and impregnating their pores to a substantial distance inwardly from their said surfaces so that relative motion between the bodies is dampingly retarded by viscous forces in the liquid; and
   C. means providing a resilient connection between each of said bodies and one of said members whereby each body is constrained to partake of a substantial portion of movement of its member relative to the other member, the last named means also providing for containment of the liquid and confinement of the bodies to limited motion relative to one another and comprising
      1. a resilient enclosure surrounding and closely embracing said bodies, and
      2. a pair of attachment means on said enclosure, one at each side of the plane of said flat surfaces of the two bodies, each attachable to one of said members and secured to a substantial area of the exterior surface of the enclosure.

3. The vibration absorbing device of claim 2 wherein said means for securing the resilient enclosure to said members comprises:

a. a pair of dished rigid parts, one spaced to each side of said plane, each having its concave surface innermost and bonded to said resilient enclosure, and
   b. an attaching element projecting substantially coaxially outwardly from each of said dished parts and rigidly secured thereto.

4. A vibration absorbing mounting element of the type comprising a pad-like elastomer body having attachment means bonded to a pair of opposite sides thereof in spaced relation to one another and to a medial plane through the body, one of said attachment means being securable to a vibration generating device and the other being securable to a member to which the vibration generating device is to be attached, said mounting element being characterized by:
A. the elastomer body being hollow;
B. a pair of rigid, porous damper members in the interior of the body, one at each side of said medial plane, each having a smooth, flat surface parallel to said plane, said surfaces of the two damper members being in opposed complementary relation to one another and each damper member having other surface portions bonded to interior surface portions of the elastomer body so that the damper members tend to move relative to one another in unison with relative motion between the attachment means; and
C. a body of lubricant liquid in the interior of the elastomer body, filling the space between said flat surfaces of the damper members and substantially filling their pores, said lubricant liquid cooperating with the damper members to have the effect of substantially increasing the hysteresis of the elastomer body.

5. A mounting element by which a vibration generating element can be carried by a supporting member in generally fixed relation to said supporting member, but by which the vibration generating device is permitted to have small movements relative to the supporting member, in response to the vibration forces generated by te device, and in which a substantial portion of the energy of such movements is absorbed so that the mounting element isolates the vibration of the device from the supporting member, said mounting element comprising:
A. a pair of attachment members, one securable to a vibration generating device and the other securable to a supporting member which carries said device;
B. a hollow elastomer pad having substantially thick wall portions and to opposite sides of which said attachment members are secured in substantially symmetrical relation to a plane through the hollow interior of the pad, said pad thus providing a resilient connection between the attachment members that provides for said small movements of the vibration generating device;
C. a pair of rigid porous bodies in the hollow interior of the pad, one at each side of said plane, each having a smooth, flat surface parallel to said plane, said bodies having other surface portions bonded to the interior surface of the pad to be thus held with their said flat surfaces in opposing, slightly spaced apart relation, the bodies being thus constrained to partake to a substantial extent of relative motion between the attachment members; and
D. a quantity of liquid lubricant in the hollow interior of the pad, filling the space between said flat surfaces of the bodies and substantially impregnating their pores, said liquid being of a kind that develops substantial shearing friction in consequence of relative movement between the bodies and thus serving to absorb a substantial amount of the energy that is expended in effecting relative motion between the bodies.

* * * * *